March 3, 1959
T. F. YATES
2,875,704
CONVEYOR SYSTEM
Filed Aug. 21, 1957
2 Sheets-Sheet 1
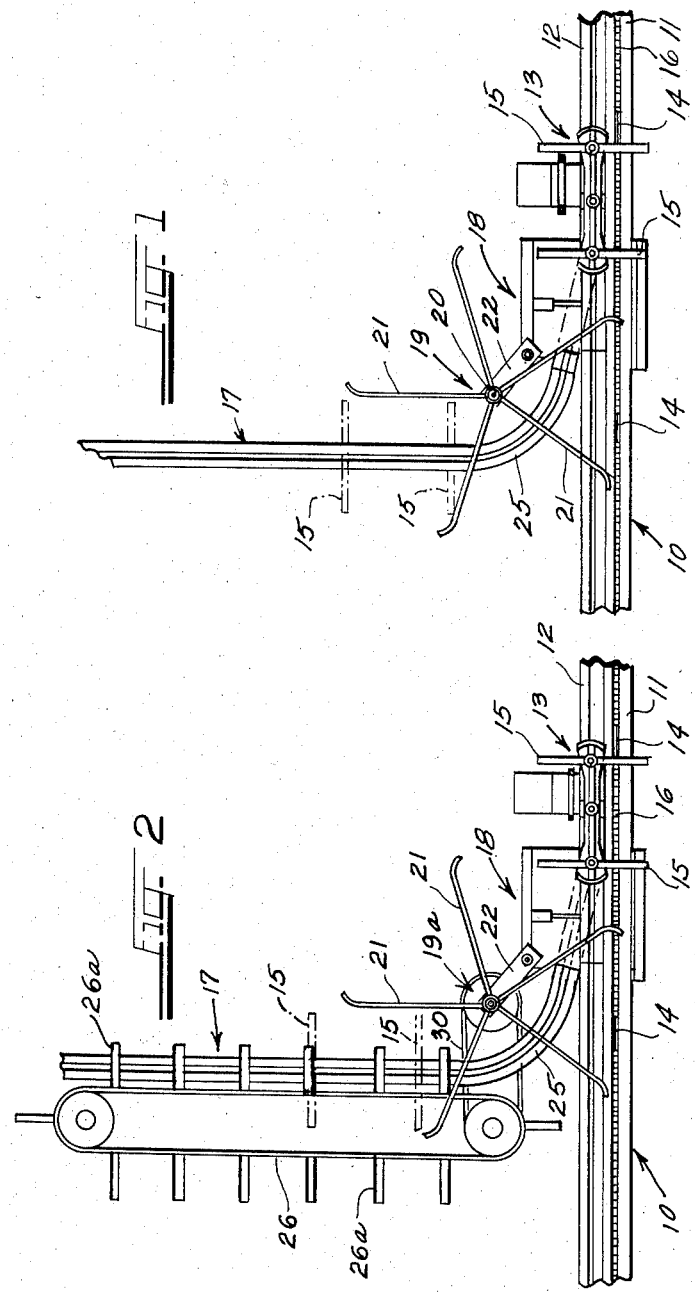
INVENTOR.
TORBIN F. YATES

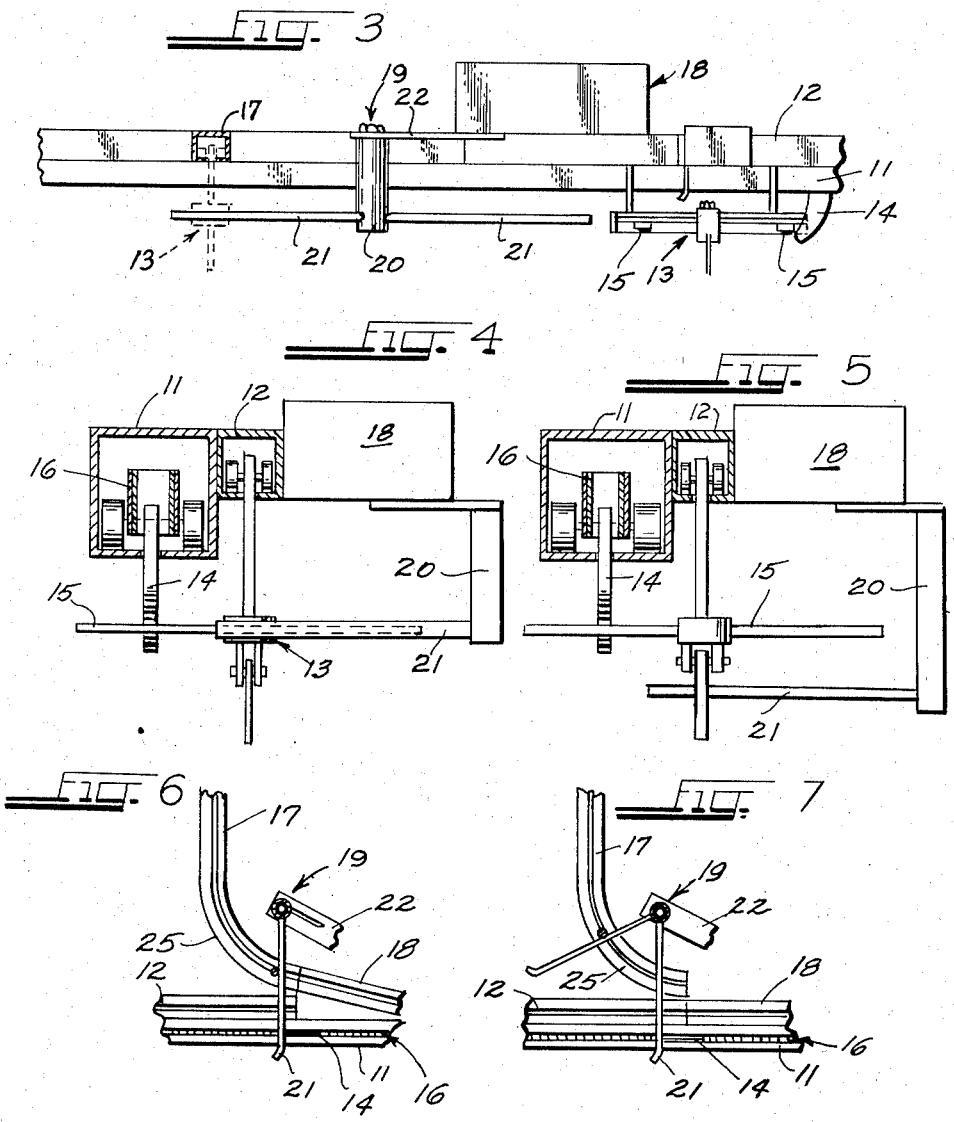

United States Patent Office 2,875,704
Patented Mar. 3, 1959

2,875,704

CONVEYOR SYSTEM

Torbin F. Yates, Wheaton, Ill.

Application August 21, 1957, Serial No. 679,377

10 Claims. (Cl. 104—96)

My invention relates to conveyor systems of the type wherein load-carrying trolleys are propelled along a free track by virtue of being engaged by pusher dogs or driving abutments carried by a driving chain which is itself adapted to operate in an adjacent chain track.

In conveyor systems of the character referred to, the power drive generally is applied only to the main track while the subsidiary or branch tracks communicating with said main track are of the free-trolley type and are arranged for gravity operation of the trolleys. In such systems the trolleys—particularly when heavily loaded, due to friction and other causes—tend to become arrested in movement somewhere along the arcuate section of the branch track immediately adjacent to the confluence of the main and branch tracks, and are caused to be propelled along the branch tracks to the point where gravity is effective, only by reason of being impacted by a successively following trolley. Such impaction may be insufficient to move such arrested trolleys resulting in a pile-up of several trolleys which may tend to injure the articles carried by the trolleys. Additionally undesirable stresses are created in the system.

In other non-gravity types of conveyor systems where each of the subsidiary or branch tracks is provided with a separately driven power chain similarly as in the main track for propelling the trolleys in the branch track, the speed of each of such branch track power chains must be separately adjusted so as to synchronize the travels of the main and branch power chains whenever the speed of the main power chain is varied. In certain installations several of such adjustments may be required during the course of a single day, if the character and kinds of articles carried by the conveyor system are changed frequently. This, of course, requires synchronizing of the separate systems which is costly and difficult to maintain.

Accordingly, it is an object of my invention to provide, in a conveyor system, means driven by the main power chain for propelling trolleys along the portion of a subsidiary free track immediately adjoining the confluence of the main and subsidiary tracks to a point where gravity or other driving means becomes effective to propel the trolleys along the subsidiary track.

Another object of my invention is the provision of trolley propelling means of the foregoing character which functions in synchronism with the operating speeds of the main power driving chain.

Still another object of my invention is the provision of means utilizing the available and reserve power of the main power driving chain for propelling trolleys along stretches of subsidiary or branch tracks.

Other and further objects of my invention will become apparent from the following description when considered in connection with the accompanying drawings in which:

Fig. 1 is a generally schematic plan view looking in an upwardly direction of a portion of an overhead conveying system embodying my invention.

Fig. 2 is a similar view showing a modified embodiment thereof.

Fig. 3 is a side elevational view of a section of the conveyor system at the confluence of a main and subsidiary conveyor track.

Fig. 4 is a cross-sectional view on an enlarged scale of a modified arrangement.

Fig. 5 is a view similar to that of Fig. 4 but showing another modified arrangement.

Figs. 6 and 7 are fragmentary plan views of the conveyor system showing the confluence of the main and subsidiary tracks and showing the same in different positions of operation.

Referring to the drawings, the numeral 10 designates generally a main conveyor track comprising a power track 11 and a free track 12 in substantially contiguous relation. A series of load carrying trolleys 13 is adapted to run in free track 12, said trolleys being propelled by means of pusher dogs or driving abutments 14 depending from a driving chain 16 travelling in power track 11 and engaging a laterally extending arm 15 of each trolley. Each of the trolleys is provided with a pair of forward and rearward arms 15, thus assuring engagement of the dogs 14 with at least one of the pair of arms during the course of movement as will be hereinafter described. At selected points along the main track 10 are free branch or subsidiary load carrying tracks 17 only one of which is illustrated. The load carrying trolleys 13 may switch from the main track 10 to the subsidiary track 17, as required, through the medium of a conventional switch arrangement indicated generally by numeral 18 which is operable in any convenient manner.

Referring particularly to Fig. 1, arranged in close proximity to the confluence of the main and auxiliary tracks 10 and 17 respectively is a rotatable member 19 comprising a hub portion 20 having a plurality of radially extending arms 21. The member 19 is supported for rotation about a vertical axis as by a suitable bracket 22 preferably attached to a ceiling or other convenient structure. The said axis of rotation preferably is coincident with the center of the radius of curvature of the arcuate portion 25 of the subsidiary track 17. The arms 21 of the member 19 are arranged to sweep over the confluence of the main and auxiliary tracks and each of the arms 21, as seen clearly in Figs. 6 and 7, is arranged to bridge the power track 11 so as to be engaged by the dogs 14 carried by the power chain 16. Thus, as the dogs 14 move along with the chain, the member 19 is caused to be rotated and in such rotation the arms 21 sweep over substantially the entire arcuate portion 25 of the subsidiary track 17 at the confluence of the main and subsidiary tracks. It is generally over this arcuate portion of the subsidiary free track that maximum resistance to movement of the load carrying trolley is experienced with the result that movement of the trolley may be totally arrested in said track portion. However, as the member 19 is caused to be rotated in the aforedescribed manner one of the radial arms 21 will be caused to engage the rearward portion of a trolley 13 arrested on the arcuate track portion 25 as illustrated in Fig. 4 or the depending structure of a trolley as illustrated in Fig. 5 and thus propel said trolley along said track portion to a point where gravity becomes effective and the load carrying trolley freely rolls down the connecting stretch of subsidiary track. The arms 21 of the member 19 in sweeping over the arcuate track portion 25 serve to maintain said track portion clear of any obstructions in the form of stalled trolleys and accordingly, the likelihood of any trolley being impacted by a succeeding trolley just entering the subsidiary track is avoided. It will be understood that the number of radial arms 21 may be varied as desired. For example in an arrangement such as is illustrated in Fig. 5 the member 19 preferably would be provided with arms more closely spaced than in the arrangement illustrated in Fig. 4.

It will also be understood that the system may also be powered by a free trolley while under power, engaging an arm 21 and rotating said arm for the distance of travel which the free trolley covers while still being driven by a dog 14 of the power chain 16 as illustrated in Figs. 4 and 5.

In Fig. 2 is illustrated a modified embodiment in which a subsidiary endless driving chain 26 having resilient lateral dogs 26a is arranged along the straight reach of the subsidiary track 17. The said driving chain is not connected with a conventional power source such as an electric motor, as in the case of chain 16. The driving chain 26, however, is driven by a belt or chain 30 cooperating with a pulley 19a operatively connected with the member 19. The chain 26 also may be driven by virtue of engagement of the radial arms 21 with the dogs 26a or other abutments carried on said chain. The dogs 26a may engage lateral arms 15 carried on the trolleys 13 or may engage the trolleys directly to propel the same along track 17 in exactly the same manner as occurs in the main track 10. Because the dogs are resilient they may yield and pass over a trolley arrested in track section 17 without stopping movement of chain 26 and other parts operatively connected therewith. The modified embodiment just described finds application primarily in situations where the straight reach of the subsidiary track may be disposed substantially in a horizontal plane or even may be inclined upwardly so that the effect of gravity is not available for propelling the trolleys along the track. It will be apparent that member 19 serves to transmit power from the main drive chain 16 to the subsidiary drive chain 26 so that the latter is caused to travel at substantially the same speed as the former. It will be seen that in this modified embodiment the arms 21 of member 19, correspondingly as in the first instance, sweep the arcuate portion 25 of the subsidiary track moving any trolleys located therein to a point where they are positively engaged by the dogs 26a on the subsidiary chain 26. The trolleys then are positively driven along the subsidiary track 17 at substantially the same speed and frequency as the trolleys are propelled along the main track 10. The subsidiary track 26 may have a small gravity decline so that the trolleys may freely run on the track. Under such conditions a loaded trolley may run ahead of a propelling dog 26a in which event the forward dogs function as resilient brakes to control the movement of the trolley.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

I claim:

1. In combination a conveyor system including a main track and at least one subsidiary track along which load carrying trolleys are adapted to travel, switching means for translating said trolleys from said main track to said subsidiary track, an endless drive chain disposed adjacent said main track and carrying depending pusher dogs adapted to engage and propel the load carrying trolleys along the main track, means disposed in close proximity to the zone of the confluence of the main and subsidiary tracks for propelling said trolleys along a portion of said subsidiary track within said zone, said means being rotatable about a vertical axis and including a plurality of radial arms arranged when rotated to bridge said main track and said subsidiary track in said zone, said arms being caused to be rotated when engaged by said pusher dogs and being arranged to engage and propel said trolleys along said portion of said subsidiary track.

2. In combination a conveyor system including a main track and at least one subsidiary track along which load carrying trolleys are adapted to travel, switching means for translating said trolleys from said main track to said subsidiary track, an endless drive chain disposed adjacent said main track and carrying depending pusher dogs adapted to engage and propel the load carrying trolleys along the main track, means disposed in close proximity to the zone of the confluence of the main and subsidiary tracks for propelling said trolleys along a portion of said subsidiary track within said zone, said means being rotatable about a vertical axis and including a plurality of radial arms, said arms being engageable by said pusher dogs and being engageable with said trolleys, the arrangement being such that movement of said pusher dogs will effect rotation of said radial arms which will engage and propel said trolleys along said portion of said subsidiary track.

3. In combination a conveyor system including a main track and at least one subsidiary track along which load carrying trolleys are adapted to travel, switching means for translating said trolleys from said main track to said subsidiary track, an endless drive chain disposed adjacent said main track and carrying depending pusher dogs adapted to engage and propel the load carrying trolleys along the main track, means disposed in close proximity to the zone of the confluence of the main and subsidiary tracks for propelling said trolleys along a portion of said subsidiary track within said zone, said portion of subsidiary track constituting a curve, said means being rotatable about a vertical axis and including a plurality of radial arms, said axis being substantially coaxial with the radial center of said curve, said arms being engageable by said pusher dogs and being engageable with said trolleys, the arrangement being such that the movement of said pusher dogs will effect rotation of said radial arms which will engage and propel said trolleys along said portion of said subsidiary track.

4. In a conveyor system having a main track and a subsidiary track along which load carrying trolleys are adapted to travel, said subsidiary track having a curved portion at its juncture with said main track, a drive chain arranged adjacent said main track and carrying depending pusher dogs adapted to engage and propel the load carrying trolleys along the main track, a member rotatable about a vertical axis and having a series of radial arms engageable by said pusher dogs and also arranged to engage said trolleys and propel the same along said curved portion of subsidiary track.

5. In a conveyor system having a main track and a subsidiary track along which load carrying trolleys are adapted to travel, said subsidiary track having a straight reach and a curved portion intermediate said main track and said straight reach, a drive chain arranged to travel adjacent said main track and carrying depending pusher dogs adapted to engage and propel the load carrying trolleys along said main track, a second chain arranged to travel adjacent the straight reach of said subsidiary track, said second chain having pusher dogs adapted to engage and propel the load carrying trolleys along said subsidiary track, a member having a plurality of radial arms and rotatable about a vertical axis, said arms being arranged to sweep over said curved track portion and adjacent portions of said main and subsidiary tracks when engaged by said first mentioned pusher dogs, said arms when rotated being caused to engage and propel the trolleys disposed in said curved track portion and also to drive said second chain, the pusher dogs of said second chain being engageable with said trolleys to propel the same along said straight reach of subsidiary track.

6. In a conveyor system having a main track and a subsidiary track along which load carrying trolleys are adapted to travel, said subsidiary track having a straight reach and a curved portion intermediate said main track and said straight reach, a drive chain arranged to travel adjacent said main track and carrying depending pusher dogs adapted to engage and propel the load carrying trolleys along said main track, a second chain arranged to travel adjacent the straight reach of said subsidiary track, said second chain having pusher dogs adapted to engage and propel the load carrying trolleys along said subsidiary track, a member having a plurality of radial arms and rotatable about a vertical axis, said member being operatively connected with said second chain so as to drive said chain when rotated, said arms being arranged to sweep over said curved track portion and adjacent portions of said main and subsidiary tracks when engaged by said first mentioned pusher dogs, said arms when sweeping over said track portion being caused to engage and propel the trolleys disposed in said curved track portion and simultaneously to drive said second chain, the pusher dogs of said second chain being engageable with said trolleys to propel the same along said straight reach of subsidiary track.

7. In a conveyor system having a main track and a subsidiary track along which load carrying trolleys are adapted to travel, a drive chain arranged adjacent said main track and carrying depending pusher dogs adapted to engage and propel the load carrying trolleys along the main track, a member rotatable about a vertical axis and having a series of radial arms each arranged to sweep across adjacent portions of said main and subsidiary tracks, said radial arms being engageable by said pusher dogs and also arranged to engage said trolleys to propel the same along the adjacent portion of said subsidiary track.

8. The invention as defined in claim 5 wherein the pusher dogs of said second chain are yieldable to permit the same to by-pass a trolley arrested on said subsidiary track.

9. In combination, a conveyor system including a main track and at least one subsidiary track along which load carrying elements are adapted to travel, switching means for translating said load carrying elements from said main track to said subsidiary track, an endless drive chain disposed adjacent said main track and carrying pusher elements adapted to engage and propel the load carrying elements along the main track, means disposed in close proximity to the zone of the confluence of the main and subsidiary tracks for propelling said load carrying elements along a portion of said subsidiary track within said zone, said means being rotatable about a vertical axis and including a plurality of radial arms arranged to bridge said main track and said subsidiary track in said zone, said arms being caused to be rotated when engaged by a moving element under power in said main track and being arranged to engage and propel other of said load carrying elements along said portion of said subsidiary track.

10. In combination, a conveyor system including a main track and at least one subsidiary track along which load carrying elements are adapted to travel, switching means for translating said load carrying elements from said main track to said subsidiary track, an endless drive chain disposed adjacent said main track and carrying pusher elements adapted to engage and propel the load carrying elements along the main track, means disposed in close proximity to the zone of the confluence of the main and subsidiary tracks for propelling said load carrying elements along a portion of said subsidiary track within said zone, said means being rotatable about a vertical axis and including a plurality of radial arms arranged to bridge said main track and said subsidiary track in said zone, said arms being caused to be rotated when engaged by a moving load carrying element under power in said main track and being arranged to engage and propel other of said load carrying elements along said portion of said subsidiary track.

References Cited in the file of this patent

UNITED STATES PATENTS

| | | |
|---|---|---|
| 1,343,631 | Louden | June 15, 1920 |
| 1,867,410 | Juergens | July 12, 1932 |
| 2,161,388 | Rosenthal | June 6, 1939 |
| 2,688,935 | Brooks | Sept. 14, 1954 |
| 2,688,936 | Brooks | Sept. 14, 1954 |
| 2,845,034 | Harrison | July 29, 1958 |

UNITED STATES PATENT OFFICE

CERTIFICATE OF CORRECTION

Patent No. 2,875,704                                                             March 3, 1959

Torbin F. Yates

It is hereby certified that error appears in the above numbered patent requiring correction and that the said Letters Patent should read as corrected below.

In the grant, lines 1, 2 and 3, for "Torbin F. Yates, of Wheaton, Illinois," read -- Torbin F. Yates, of Wheaton, Illinois, assignor to Kroehler Mfg. Co., of Naperville, Illinois, a corporation of Illinois, --; line 12, for "Torbin F. Yates, his heirs" read -- Kroehler Mfg. Co., its successors --; in the heading to the printed specification, line 3, for "Torbin F. Yates, Wheaton, Ill." read -- Torbin F. Yates, Wheaton, Ill., assignor to Kroehler Mfg. Co., Naperville, Ill., a corporation of Illinois --.

Signed and sealed this 23rd day of June 1959.

(SEAL)
Attest:

KARL H. AXLINE

Attesting Officer

ROBERT C. WATSON
Commissioner of Patents